Dec. 14, 1948.  O. R. CEDARHOLM  2,456,375
VEHICLE BUMPER JACK
Filed July 21, 1947

Inventor
Oscar R. Cedarholm

By *Clarence A. O'Brien and Harvey B. Jacobson*
Attorneys

Patented Dec. 14, 1948

2,456,375

UNITED STATES PATENT OFFICE 2,456,375

VEHICLE BUMPER JACK

Oscar R. Cedarholm, Quincy, Mich., assignor of twenty per cent to Oscar R. Cedarholm, Jr., Fairfield, Conn.

Application July 21, 1947, Serial No. 762,465

6 Claims. (Cl. 254—133)

The present invention relates to new and useful improvements in jacks and more particularly to vehicle bumper jacks.

An important object of the invention is to provide a safe, non-slipping clamp or rest carried by the jack for engaging a vehicle bumper while the vehicle is being jacked.

Another object is to provide a bumper rest which may be used on a jack post of various types of jacks, such as screw, friction, hydraulic, ratchet or other well known types of jacks.

A further object is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 2:
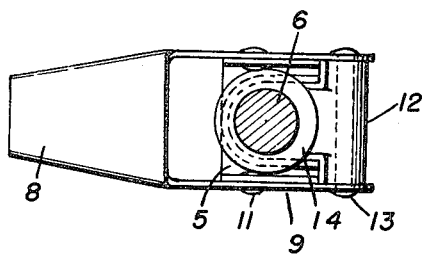
Figure 2 is a top plan view.
Figure 3:
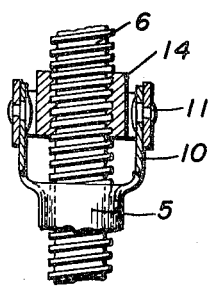
Figure 3 is a fragmentary vertical sectional view taken on a line 3—3 of Figure 1.
Figure 1:
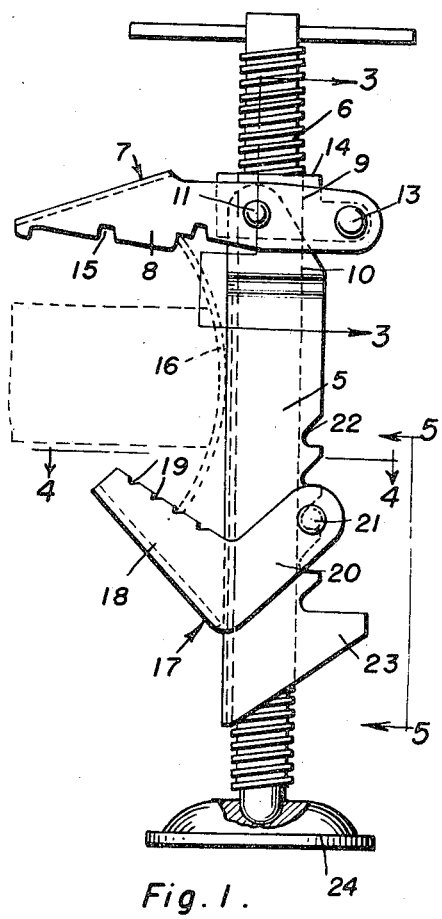
Figure 1 is a side elevational view.
Figure 4:
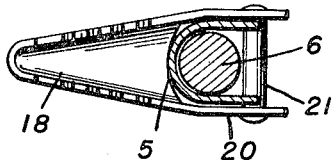
Figure 4 is a transverse sectional view taken on a line 4—4 of Figure 1.
Figure 5:
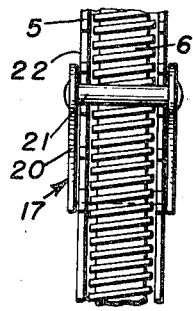
Figure 5 is a fragmentary rear elevational view taken at a point indicated by lines 5—5 of Figure 1.

Referring to the drawing in detail wherein for the purpose of illustration I have disclosed a preferred embodiment of my invention, the numeral 5 designates an elongated slide of U-shape in cross section and positioned vertically on a jack post 6 which may be of a screw type, as illustrated in Figure 1, or which may form a part of other types of jacks, such as friction, hydraulic or ratchet jacks.

A rocker 7 includes a forwardly projecting inverted channel arm 8 whose flanges project rearwardly at opposite sides of the screw to provide a yoke 9 whose sides are pivoted intermediate their ends to upwardly extending ears 10 rising from the sides of slide 5 by rivets 11. The rear ends of yoke 9 are pivoted to a lug 12 by a pin 13, the lug projecting at the rear edge of a nut or carrier 14 threaded on the screw.

The lower edges of channeled arm 8 are formed with aligned notches 15 to receive the upper edge of a vehicle bumper 16.

A V-shaped bumper rest designated generally at 17 includes a forwardly projecting, upwardly inclined channeled arm 18 having notches 19 in its upper edge for receiving the lower edge of the bumper, and a pair of rearwardly projecting spaced parallel arms 20 positioned at opposite sides of the slide 5, the arms 20 being formed as a continuation of the flanges of arm 18 and are likewise inclined upwardly.

A pin 21 connects the rear ends of arms 20 behind the slide 5 and is selectively seated in vertically spaced notches 22 formed in the rear lower edge of the slide to vertically adjust the bumper rest 17 on the slide.

A stop 23 projects rearwardly from the lower edge of the slide to prevent removal of the bumper rest therefrom.

In the operation of the device, the screw is supported at its lower end in a base 24 and the slide 5 is supported on the jack post by the nut 14 and rocker 7. The rest 17 is adjusted on the slide to engage the lower edge of the bumper 16 and with the rocker 7 engaging the upper edge of the bumper as shown in Figure 1.

The jack post is rotated in a direction to move nut 14 upwardly which thus raises slide 5, rocker 7 and rest 17 between which the bumper is secured to thus jack a vehicle to which the bumper is attached.

The initial upward movement of nut 14 raises the rear end of yoke 9 by pin 13 to pivot the rocker 7 on rivets 11 and thus force arms 8 downwardly into tight clamping engagement with the bumper to hold the bumper on the arm 18 of bumper seat 17.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A jack of the class described comprising in combination with a jack post of a pair of coacting vehicle bumper clamping members, and means supporting the clamping members for vertical adjustment on the post, one of said clamping members being pivoted to said supporting means and movable into and out of clamping engagement with the bumper by the vertical adjustment of the supporting means.

2. A jack of the class described comprising in combination with a jack post of a pair of coacting vehicle bumper clamping members, and means supporting the clamping members for vertical adjustment on the post, one of said clamping members having a clamping action controlled by the vertical movement of said supporting means, and the other of said clamping members being vertically adjustable on said supporting means.

3. A jack of the class described comprising in combination with a jack post of a vertically adjustable slide carried by the post, a vertically adjustable vehicle bumper rest carried by the slide, and a vehicle bumper clamping arm pivoted on the slide and coacting with the rest to clamp a bumper thereon.

4. A jack of the class described comprising in combination with a jack post of a vertically adjustable slide carried by the post, a vertically adjustable vehicle bumper rest carried by the slide, and a vehicle bumper clamping arm pivoted on the slide and coacting with the rest to clamp a bumper thereon, said arm being movable into and out of clamping engagement by a vertical adjustment of the slide.

5. A jack of the class described comprising in combination with a jack post of a slide carried by the post, a carrier vertically adjustable on the post and connected to the slide, a rocker pivoted to the upper end of the slide and connected to the carrier for actuation by a vertical movement of the carrier, and a vehicle bumper rest carried by the slide, said rocker coacting with the rest to clamp a bumper thereon.

6. A jack of the class described comprising in combination with a jack post of a slide carried by the post, a carrier vertically adjustable on the post and connected to the slide, a rocker pivoted to the upper end of the slide and connected to the carrier for actuation by a vertical movement of the carrier, and a vehicle bumper rest carried by the slide, said rocker coacting with the rest to clamp a bumper thereon, and said rest being vertically adjustable on the slide.

OSCAR R. CEDARHOLM.

REFERENCES CITED

The following references are of record in the file of this patent:

UNITED STATES PATENTS

| Number    | Name         | Date          |
|-----------|--------------|---------------|
| 1,286,041 | McBride      | Nov. 26, 1918 |
| 2,054,568 | Beach        | Sept. 15, 1936 |
| 2,097,949 | Johnson      | Nov. 2, 1937  |
| 2,119,028 | Schmidt et al. | May 31, 1938 |
| 2,259,789 | Akins        | Oct. 21, 1941 |

FOREIGN PATENTS

| Number  | Country | Date         |
|---------|---------|--------------|
| 791,725 | France  | Oct. 7, 1935 |